(12) United States Patent
Wang et al.

(10) Patent No.: US 12,436,908 B2
(45) Date of Patent: Oct. 7, 2025

(54) METHOD OF SYNCHRONIZATION FOR UNIVERSAL SERIAL BUS AND SYSTEM THEREOF

(71) Applicant: MEDIATEK INC., Hsin-Chu (TW)

(72) Inventors: Chih-Chieh Wang, Hsinchu (TW); Tse-Wei Wang, Hsinchu (TW); Yu-Cheng Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 8 days.

(21) Appl. No.: 18/381,175

(22) Filed: Oct. 18, 2023

(65) Prior Publication Data

US 2025/0130966 A1     Apr. 24, 2025

(51) Int. Cl.
*G06F 13/38*     (2006.01)
(52) U.S. Cl.
CPC .... *G06F 13/382* (2013.01); *G06F 2213/0042* (2013.01)
(58) Field of Classification Search
CPC ...................................................... G06N 20/00
See application file for complete search history.

(56) References Cited

U.S. PATENT DOCUMENTS

| | | | | |
|---|---|---|---|---|
| 8,553,753 | B2* | 10/2013 | Hsieh | H04L 25/03006 375/354 |
| 8,606,961 | B2* | 12/2013 | Farkas | H04L 45/021 370/254 |
| 2018/0336160 | A1 | 11/2018 | Fukumoto | |
| 2019/0034376 | A1* | 1/2019 | Das Sharma | G06F 12/1009 |

FOREIGN PATENT DOCUMENTS

| | | |
|---|---|---|
| CN | 101876958 A | 11/2010 |
| TW | 201820163 A | 6/2018 |
| TW | 202223594 A | 6/2022 |

OTHER PUBLICATIONS

Uri Hermoni,Gal Yedidia.USB4(TM) Logical Layer, Re-timer and Transport Layer.USB Enabling Connections.Nov. 19, 2019. https://www.usb.org/document-library/usb4tm-logical-layer-re-timer-and-transport-layer, pp. 1-115. ,Nov. 19, 2019.

* cited by examiner

*Primary Examiner* — Henry Tsai
*Assistant Examiner* — Juanito C Borromeo
(74) *Attorney, Agent, or Firm* — Winston Hsu

(57) ABSTRACT

A method of synchronization in a training state of Universal Serial Bus (USB) includes sending SLOS1 ordered sets by a transmitter in a LOCK1 state, receiving the SLOS1 ordered sets by a receiver in the LOCK1 state, stopping the transmitter from sending training ordered sets according to a lane adapter state machine (LASM) if the transmitter sends the training ordered sets in the LOCK1 state continuously in an infinite loop. The training ordered sets include the SLOS1 ordered sets. The method further includes sending new SLOS1 ordered sets by the transmitter, receiving the new SLOS1 ordered sets by a receiver, and the transmitter and the receiver entering a LOCK2 state. The length of the new SLOS1 ordered sets is different from the length of the SLOS1 ordered sets.

19 Claims, 4 Drawing Sheets

METHOD OF SYNCHRONIZATION FOR UNIVERSAL SERIAL BUS AND SYSTEM THEREOF

BACKGROUND

Universal Serial Bus (USB) is an industry standard that specifies the physical interfaces and protocols for connecting, data transferring and powering of hosts, such as personal computers, peripherals, e.g., keyboards and mobile devices, and intermediate hubs. USB was designed to standardize the connection of peripherals to computers, replacing various interfaces such as serial ports, parallel ports, game ports, and ADB (Android Debug Bridge) ports. It has become a general standard for a wide range of devices, such as keyboards, mice, cameras, printers, scanners, flash drives, smartphones, game consoles, and power banks. As of 2023, USB consists of four generations of specifications: USB 1.x, USB 2.0, USB 3.x, and USB4.

USB4 (sometimes referred to as USB 4.0) is a new generation of the Universal Serial Bus (USB) standard released in 2019 by the USB Implementers Forum (USB-IF). It is based on the Thunderbolt 3 protocol specification yet also supports multiple data and display protocols, such as DisplayPort and PCI Express (PCIe). The USB4 architecture can share a single, high-speed link with multiple hardware endpoints dynamically, best serving each transfer by data type and application. The USB4 contains enhanced data transfer and power supply functionality with connection-oriented, tunneling architecture designed to combine multiple protocols onto a single physical interface, so that the total speed and performance of the USB4 Fabric can be dynamically shared.

Key characteristics of USB4 include two-lane operation using existing USB Type-C cables and up to 80 Gbps operation over 80 Gbps certified cables, multiple data and display protocols to efficiently share the maximum aggregate bandwidth over the bus, and backwards compatibility with all previous versions of USB.

USB4 by itself does not provide any generic data transfer mechanism or device classes like USB 3.x, but serves mostly as a way to tunnel other protocols such as USB 3.2, DisplayPort, and optionally PCIe. With the USB4 1.0 specification, when the host and device do not support optional PCIe tunneling, the non-display bandwidth is limited to mandatory 10 Gbit/s described by USB 3.2, but including optional support for 20 Gbit/s. The USB4 2.0 specification introduced optional support for a new USB3 Gen T tunneling that extends the USB3 protocol to be able to use the maximum available bandwidth. USB4 2.0 specifies tunneling of USB 3.2 ("Enhanced SuperSpeed") Tunneling, DisplayPort 2.1-based Tunneling, and PCIe-based Tunneling.

A lane adapter that negotiated a USB4 Gen 2 or Gen 3 link shall follow the Training sub-state machine described in USB4 specification with the behavior described and the sub-state transitions described in the same. The purpose of the Training state is to ensure that a transmitter and a receiver are synchronized with each other so that they can each other understand the data content conveyed. To achieve this goal, the receiver would compare the received order set (e.g., SLOS1, SLOS2, TS1, and TS2) with its stored information. Taking LOCK1 state as an example, after the receiver receives two SLOS1, it will refer to the stored information to confirm whether the two received SLOS1 are consecutive. If they are, the sub-state synchronization is successful, and it can proceed to the next step. However, once an erroneous order set was transmitted during one of the states (i.e., LOCK1, LOCK2, TS1, and TS2), the lane adapter state machine (LASM) would go back to the LOCK1 state causing an infinite loop. It may ultimately cause the training state not be able to complete successfully.

SUMMARY

An embodiment provides a method of synchronization in a training state of Universal Serial Bus (USB). The method includes sending SLOS1 ordered sets by a transmitter in a LOCK1 state, receiving the SLOS1 ordered sets by a receiver in the LOCK1 state, stopping the transmitter from sending training ordered sets according to a lane adapter state machine (LASM) if the transmitter sends the training ordered sets in the LOCK1 state continuously in an infinite loop. The training ordered sets include the SLOS1 ordered sets. The method further includes sending new SLOS1 ordered sets by the transmitter, receiving the new SLOS1 ordered sets by a receiver, and the transmitter and the receiver entering a LOCK2 state. A length of the new SLOS1 ordered sets is different from a length of the SLOS1 ordered sets.

An embodiment provides a Universal Serial Bus (USB) system including a transmitter, and a receiver coupled to the transmitter. The transmitter is used to send training ordered sets. The training ordered sets include SLOS1 ordered sets. The receiver is used to receive the training ordered sets. The transmitter stops sending the training ordered sets according to a lane adapter state machine (LASM) if the transmitter sends the training ordered sets in a LOCK1 state continuously in an infinite loop. Then, the transmitter sends new SLOS1 ordered sets in the LOCK1 state. A length of the new SLOS1 ordered sets is different from a length of the SLOS1 ordered sets.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
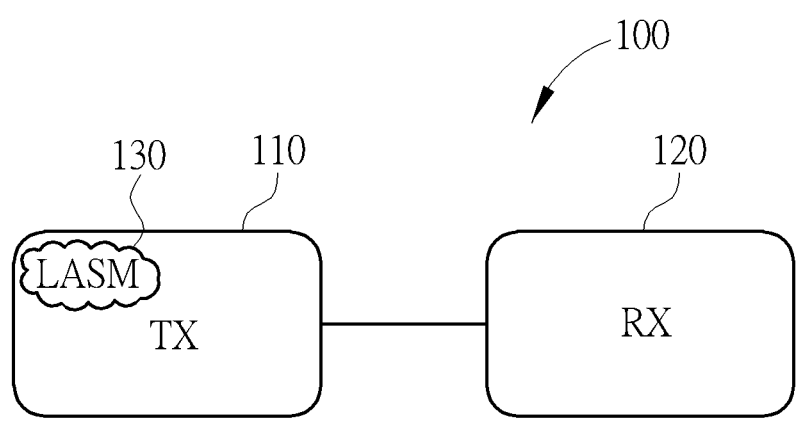
FIG. 1 is an exemplary diagram illustrating a USB system of an embodiment.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving signals according to one or more of Universal Serial Bus Specifications (e.g., USB 1.x, USB 2.0, USB 3.x, and USB4). The terms "Gen 2" and "Gen 3" may respectively refer to the second generation and the third generation standard published by the USB-IF.

In accordance with this disclosure, a "lane" refers to the dual simplex high speed differential signaling pair that provides communication between a Downstream Facing Port (DFP) and an Upstream Facing Port (UFP). The signaling rate at which a lane operates defines the speed of communication for that lane.

In accordance with this disclosure, a lane adapter state machine (LASM) is a component in the logical layer that manages the communication between different lanes of USB. The LASM is responsible for adapting the data format, protocol, and speed of each lane to match the requirements of the destination and describes the behavior of the logical link layer during the linkup sequence. The logical layer is part of the protocol that defines how data is transferred in the USB4 architecture. The role of the logical layer is to provide services to the transmitter and receiver for error detection and recovery, conveying different media, and power management. The lane adapter is an adapter that interfaces to a Lane. A USB4 Port has two lane adapters: a lane 0 adapter and a lane 1 adapter.

According to the USB4 specification, the LASM includes the following states:

Disabled state: The lane adapter disables the lane.
CLd state: Lane adapter transmitter and receiver are inactive.
Training state: The lane adapter performs symbol synchronization and transfer of lane parameters.
CL0 state: The lane adapter can transmit and receive transport layer packets across the lane.
Lane Bonding state: The lane adapter can bond two single lane links into a dual-lane link.
CL0s, CL1, CL2 states: Low power states.

Also in accordance with the USB4 specification, Gen 2 and Gen 3 training state includes the following sub-states with the corresponding transmitter behaviors, as shown in Table 1-1:

TABLE 1-1

| State | Transmitter Behavior |
| --- | --- |
| LOCK1 | Transmitter shall send back-to-back SLOS1. When a Lane Adapter transitions to the training state from the CL0 state, its transmitter may transmit up to 16 symbol times of random bits before sending the first SLOS1 that is not RS-FEC encoded. |
| LOCK2 | Transmitter shall send back-to-back SLOS2. |
| TS1 | Transmitter shall send back-to-back TS1 ordered sets. |
| TS2 | Transmitter shall send back-to-back TS2 ordered sets. |

During the training state, symbols are synchronized and lane parameters are transferred between two ends (i.e., the transmitter and the receiver) of the lane. Furthermore, Gen 2 and Gen 3 sub-state transition behaviors are described in the following Table 1-2:

TABLE 1-2

| Transition | From State | To State | Conditions |
| --- | --- | --- | --- |
| 1 | LOCK1 | LOCK2 | Received 2 SLOS symbols (SLOS1 and/or SLOS2) in a row. Sent at least 2 complete SLOS1. Receiver completed TxFFE negotiation (i.e. Rx Locked = 1b). |
| 2 | LOCK2 | TS1 | Received 2 SLOS2 Symbols in a row. Sent at least 2 complete SLOS2. |

TABLE 1-2-continued

| Transition | From State | To State | Conditions |
| --- | --- | --- | --- |
| 3 | TS1 | TS2 | Gen 2: Received 2 TS1 ordered sets in a row. Sent at least 32 TS1 ordered sets. Gen 3: Received 2 TS1 ordered sets in a row. Sent at least 16 TS1 ordered sets. |
| 4 | TS1 | LOCK2 | Received 2 SLOS1 Symbols in a row. |
| 5 | TS2 | LOCK2 | Received 2 SLOS Symbols (SLOS1 and/or SLOS2) in a row. |
| 6 | TS2 | CL0 | Gen 2: Received 2 TS2 ordered sets in a row. Sent at least 16 TS2 ordered sets. Gen 3: Received 2 TS2 ordered sets in a row. Sent at least 8 TS2 ordered sets. |
| 7 | Any | CLd | Adapter remains in Training state for tTrainingAbort1 or tTrainingAbort2 time. |
| 8 | Any | LOCK1 | A timeout error |

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

FIG. 1 is a diagram illustrating a Universal Serial Bus (USB) system 100 of an embodiment. The USB system 100 includes a transmitter (TX) 110, and a receiver (RX) 120 coupled to the transmitter 110. The transmitter 110 is used to send training ordered sets, and the receiver 120 is used to receive the training ordered sets. The receiver 120 may also relay feedback information to the transmitter 110 for synchronization purpose. The transmitter 110 may implement LASM 130. The USB system 100 may comply with the USB4 specification.

In a scenario which an erroneous order set was transmitted during one of the states (i.e., LOCK1, LOCK2, TS1, or TS2), the LASM 130 may retract to LOCK1 state and make the transmitter 110 to transmit SLOS1 ordered sets. This is to retrain the transmitter 110 and the receiver 120. In a real world situation, however, the transmitter 110 is likely to transmit SLOS1 ordered sets continuously in an infinite loop when the above scenario happens. It would ultimately cause the training state not be able to complete successfully. Thus, embodiments of the solution to the above problem are described in this disclosure.

Figure 2:
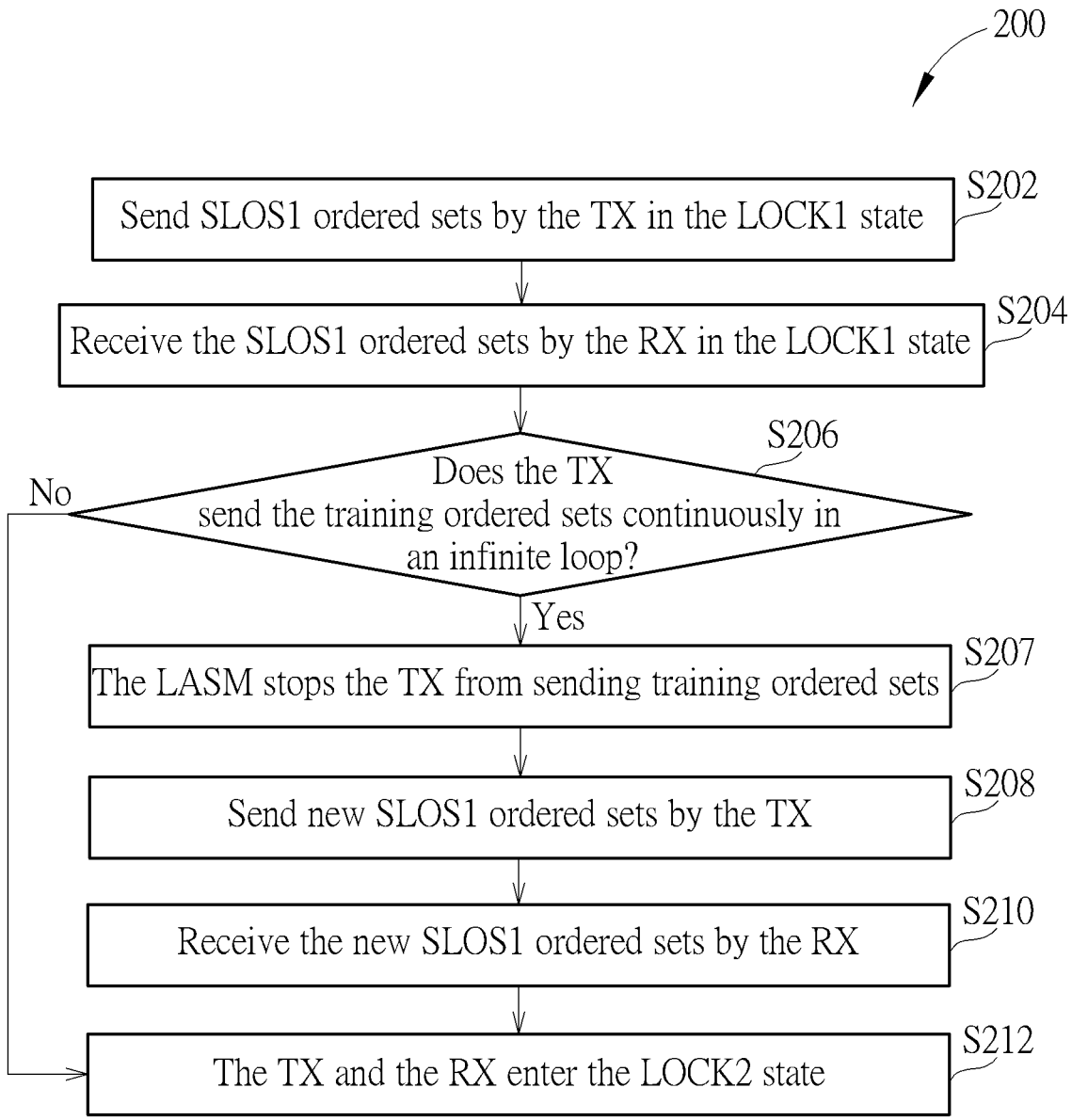
FIG. 2 is a flowchart illustrating a method of synchronization in the training state implemented by the USB system of FIG. 1.

FIG. 2 is a flowchart illustrating a method 200 of synchronization in the training state implemented by the USB system 100. The training ordered sets may have different types, e.g., SLOS1, SLOS2, TS1 and TS2 ordered sets. The method 200 includes the following steps:

S202: Send SLOS1 ordered sets by the transmitter 110 in the LOCK1 state;
S204: Receive the SLOS1 ordered sets by the receiver 120 in the LOCK1 state;

S206: Does the transmitter send the training ordered sets continuously in an infinite loop? If so, proceed to S207; if not, proceed to S212;

S207: The LASM 130 stops the transmitter 110 from sending training ordered sets;

S208: Send new SLOS1 ordered sets by the transmitter 110;

S210: Receive the new SLOS1 ordered sets by the receiver 120; and

S212: The transmitter 110 and the receiver 120 enter the LOCK2 state.

It should be noted that the length of the new SLOS1 ordered sets in steps S208 and S210 may be different from the length of the original SLOS1 ordered sets in steps S202 and S204. That is, in some embodiments, the length of the new SLOS1 ordered sets may be longer than the length of the original SLOS1 ordered sets; in some other embodiments, the length of the new SLOS1 ordered sets may be shorter than the length of the original SLOS1 ordered sets. The examples of the method 200 are depicted in the following paragraphs and associated figures.

Figure 3:
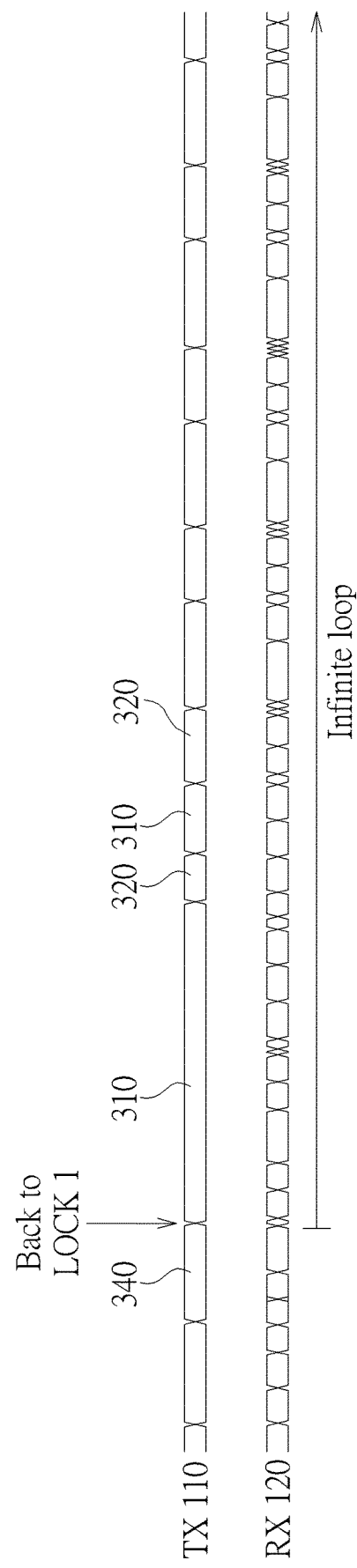
FIG. 3 illustrates scenario where an exemplary synchronization error occurs to the transmitter and the receiver of FIG. 1.

FIG. 3 illustrates an exemplary scenario where synchronization error occurs to the transmitter 110 and the receiver 120. When corrupted T2 ordered sets 340 is transmitted during the training state, the LASM 130 may detect an error and go back to the LOCK1 state causing the transmitter 110 to send SLOS1 ordered sets 310 and SLOS2 ordered sets 320 in an alternate manner. As a result, the receiver 120 would fail to synchronize its state with the transmitter 110. This situation would cause an infinite loop and both the transmitter 110 and the receiver 120 would be in the training state indefinitely. This means that the transmitter 110 and the receiver 120 may not be able to enter the CL0 state for data transmission. As a result, the USB link may fail.

Figure 4:
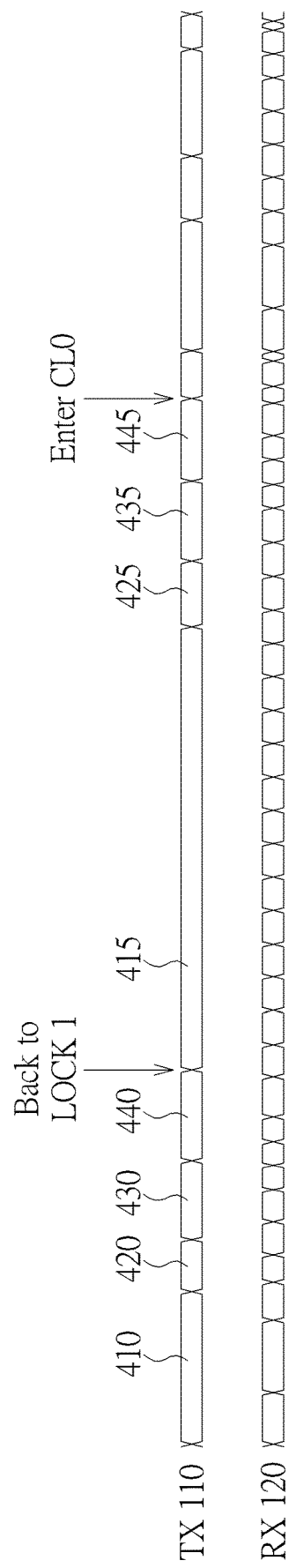
FIG. 4 illustrates an exemplary scenario where synchronization error can be recovered with the implementation of the method of FIG. 2.

FIG. 4 illustrates an exemplary scenario where synchronization error can be recovered with the implementation of the method 200. During the training state, the transmitter 110 may send SLOS1 ordered sets 410, SLOS1 ordered sets 420, TS1 ordered sets 430, and TS2 ordered sets 440 in sequence to synchronize the transmitter 110 with the receiver 120. Note that the receiver 120 may also relay feedback information to the transmitter 110 for synchronization purpose.

In the scenario where the T2 ordered sets 440 is corrupted, the LASM 130 may detect an error and go back to the LOCK1 state. At this time, the transmitter 110 may send a new SLOS1 ordered sets 415 to restart the training. The new SLOS1 ordered sets 415 may be longer than the SLOS1 ordered sets 410. For example, the length of the new SLOS1 ordered sets 415 may be 1.5 to 2 times the length of the SLOS1 ordered sets 410. In some implementations, the new SLOS1 ordered sets 415 may be 2 to 3 times the length of the SLOS1 ordered sets 410. The disclosure is not limited thereto. The longer SLOS1 ordered sets 415 may allow the receiver 120 to have more time to synchronize its state with the transmitter 110, thus avoiding the infinite loop described above due to transmission delay.

After the LOCK1 state is completed, the transmitter 110 and the receiver 120 enter the subsequent states successively, i.e., LOCK2, TS1 and TS2. The transmitter 110 respectively transmits SLOS2 ordered sets 425, TS1 ordered sets 435, and TS2 ordered sets 445. After the transmitter 110 and the receiver 120 are synchronized in the TS2 state, the transmitter 110 and the receiver 120 may enter the CL0 state for transmitting and receiving data packets. In this way, the behavior of the USB system 100 can be recovered back to normal.

The above described embodiments of the USB system can recover itself from the faulty synchronization behavior. As a result, the fault tolerance of the USB system may be enhanced and become more robust.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single-chip processor or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of synchronization in a training state for Universal Serial Bus (USB), comprising:
   sending SLOS1 ordered sets by a transmitter in a LOCK1 state;
   receiving the SLOS1 ordered sets by a receiver in the LOCK1 state;
   stopping the transmitter from sending training ordered sets according to a lane adapter state machine (LASM) if the transmitter sends the training ordered sets in the LOCK1 state continuously in an infinite loop, the training ordered sets comprising the SLOS1 ordered sets;
   sending new SLOS1 ordered sets by the transmitter, a length of the new SLOS1 ordered sets being different from a length of the SLOS1 ordered sets;
   receiving the new SLOS1 ordered sets by a receiver; and
   the transmitter and the receiver entering a LOCK2 state.

2. The method of claim 1 further comprising sending SLOS2 ordered sets by the transmitter in the LOCK2 state, and receiving the SLOS2 ordered sets by the receiver in the LOCK2 state.

3. The method of claim 2, wherein the training ordered sets further comprises the SLOS2 ordered sets.

4. The method of claim 1 further comprising sending TS1 ordered sets by the transmitter in a TS1 state, and receiving the TS1 ordered sets by the receiver in the TS1 state.

5. The method of claim 4, wherein the training ordered sets further comprises the TS1 ordered sets.

6. The method of claim 1 further comprising sending TS2 ordered sets by the transmitter in a TS2 state, and receiving the TS2 ordered sets by the receiver in the TS2 state.

7. The method of claim 6, wherein the training ordered sets further comprises the TS2 ordered sets.

8. The method of claim 6 further comprising the transmitter and the receiver entering a CL0 state after the transmitter and the receiver are synchronized in the TS2 state.

9. The method of claim 1, wherein a length of the new SLOS1 ordered sets is at least 1.5 multiple of a length of SLOS1 ordered sets.

10. A Universal Serial Bus (USB) system comprising:
    a transmitter configured to send training ordered sets, the training ordered sets comprising SLOS1 ordered sets; and
    a receiver coupled to the transmitter, configured to receive the training ordered sets;
    wherein:
    the transmitter stops sending the training ordered sets according to a lane adapter state machine (LASM) if the transmitter sends the training ordered sets in a LOCK1 state continuously in an infinite loop;
    the transmitter sends new SLOS1 ordered sets in the LOCK1 state; and
    a length of the new SLOS1 ordered sets is different from a length of the SLOS1 ordered sets.

11. The USB system of claim 10, wherein the transmitter sends the SLOS1 ordered sets in a LOCK1 state, and the receiver receives the SLOS1 ordered sets in the LOCK1 state.

12. The USB system of claim 10, wherein the transmitter sends SLOS2 ordered sets in a LOCK2 state, and the receiver receives the SLOS2 ordered sets in the LOCK2 state.

13. The USB system of claim 12, wherein the training ordered sets further comprises the SLOS2 ordered sets.

14. The USB system of claim 10, wherein the transmitter sends TS1 ordered sets in a TS1 state, and the receiver receives the TS1 ordered sets in the TS1 state.

15. The USB system of claim 14, wherein the training ordered sets further comprises the TS1 ordered sets.

16. The USB system of claim 10, wherein the transmitter sends TS2 ordered sets in a TS2 state, and the receiver receives the TS2 ordered sets in the TS2 state.

17. The USB system of claim 16, wherein the training ordered sets further comprises the TS2 ordered sets.

18. The USB system of claim 16, wherein the transmitter and the receiver both enter a CL0 state after the transmitter and the receiver are synchronized in the TS2 state.

19. The USB system claim 10, wherein a length of the new SLOS1 ordered sets is at least 1.5 multiple of a length of SLOS1 ordered sets.

\* \* \* \* \*